Patented Oct. 3, 1922.

1,430,632

UNITED STATES PATENT OFFICE.

JAMES L. DUSEK, OF CLEVELAND, OHIO.

PROTECTIVE COATING FOR MEDICINAL PURPOSES.

No Drawing.   Application filed May 26, 1922.   Serial No. 563,965.

*To all whom it may concern:*

Be it known that I, JAMES L. DUSEK, a citizen of the United States, residing at Cleveland, in the county of Cuyahoga and State of Ohio, have invented a certain new and useful Improvement in Protective Coatings for Medicinal Purposes, of which the following is a full, clear, and exact description.

This invention relates to a new and useful composition of matter and has particular reference to a composition for lining a cavity in a tooth.

The present invention contemplates the provision of a liquid composition for lining a previously cleaned cavity in a tooth before the same is filled in the usual or any approved manner.

Some of the objects of the present invention are to provide a lining composition of the aforesaid character which shall be a non-conductor of heat and cold and which shall be impervious to acids sometimes present in some filling compositions; to provide a lining composition which shall be of a liquid nature and which may be easily and quickly applied to the cavity; to provide a lining composition which shall consist of few ingredients which are inexpensive and which may be readily mixed to form the aforesaid composition; while further objects and advantages will appear as the description proceeds.

In preparing my composition I mix together the following ingredients in substantially the proportions specified:

| | |
|---|---|
| Mastic | 50 grains. |
| Gutta percha | 180 grains. |
| Amyl acetate | 1 drachm. |
| Chloroform | 6 drachms. |

The mastic is first dissolved in the amyl acetate to form a substantially saturated solution and the gutta percha which is preferably of the white variety is dissolved in the chloroform to form a second substantially saturated solution. The mastic-amyl acetate solution is then added to the gutta percha-chlorform solution to form approximately an ounce of my liquid composition which is then ready for use and may be conveniently applied to a previously cleaned cavity by a broach.

The mastic serves as an adhesive and retains the gutta percha on the walls defining the cavity. The amyl acetate not only functions as a suitable solvent for the mastic but also retards the evaporation of the chloroform in the composition as it rises to the top of the solution and forms a protective layer thereover. The gutta percha is essentially the base of the solution as it forms the lining on the walls of the cavity and serves as a non-conductor of heat and cold and also resists any acids which might be present in some fillings of a cementitious character. The chloroform serves as a solvent for the gutta percha and is also desirable as it imparts a soothing effect to the tooth when the lining composition is applied to the cavity.

My lining composition is particularly valuable for lining a cavity in a tooth in which the nerve is still alive as the chloroform imparts a soothing effect thereto and the gutta percha which forms the lining, serves as a barrier to sudden changes in temperature which ordinarily are readily conducted by the filling to the nerve.

While my lining composition serves as a protective coating for the cavity of a tooth I also find that it may be successfully used as a protective coating for cuts, burns, or wounds where it is desired to prevent infection.

Having thus described my invention, what I claim is:

1. A protective coating for medicinal purposes comprising a large proportion of a saturated solution of gutta percha and a relatively small proportion of an adhesive for said gutta percha.

2. A protective coating for medicinal purposes comprising the following ingredients in substantially the proportions specified:

| | |
|---|---|
| Mastic | 50 grains. |
| Gutta percha | 180 grains. |
| Amyl acetate | 1 drachm. |
| Chloroform | 6 drachms. |

3. A protective coating for medicinal purposes comprising gutta percha, a sufficient quantity of a low boiling point solvent for said gutta percha to form a substantially saturated solution therewith, mastic, and a solvent for said mastic, the mastic and solvent therefor forming a relatively small proportion of the whole.

4. A protective coating for medicinal purposes comprising a relative small proportion of a substantially saturated solution of mastic and amyl acetate, and a major portion of a substantially saturated solution of gutta percha and chloroform.

5. A protective coating for medicinal purposes comprising substantially six parts by volume of a saturated solution of gutta percha and chloroform, and one part by volume of a saturated solution of mastic and amyl acetate.

In testimony whereof, I hereunto affix my signature.

JAMES L. DUSEK.